SOLID STATE BINARY ADDER
Filed April 15, 1965
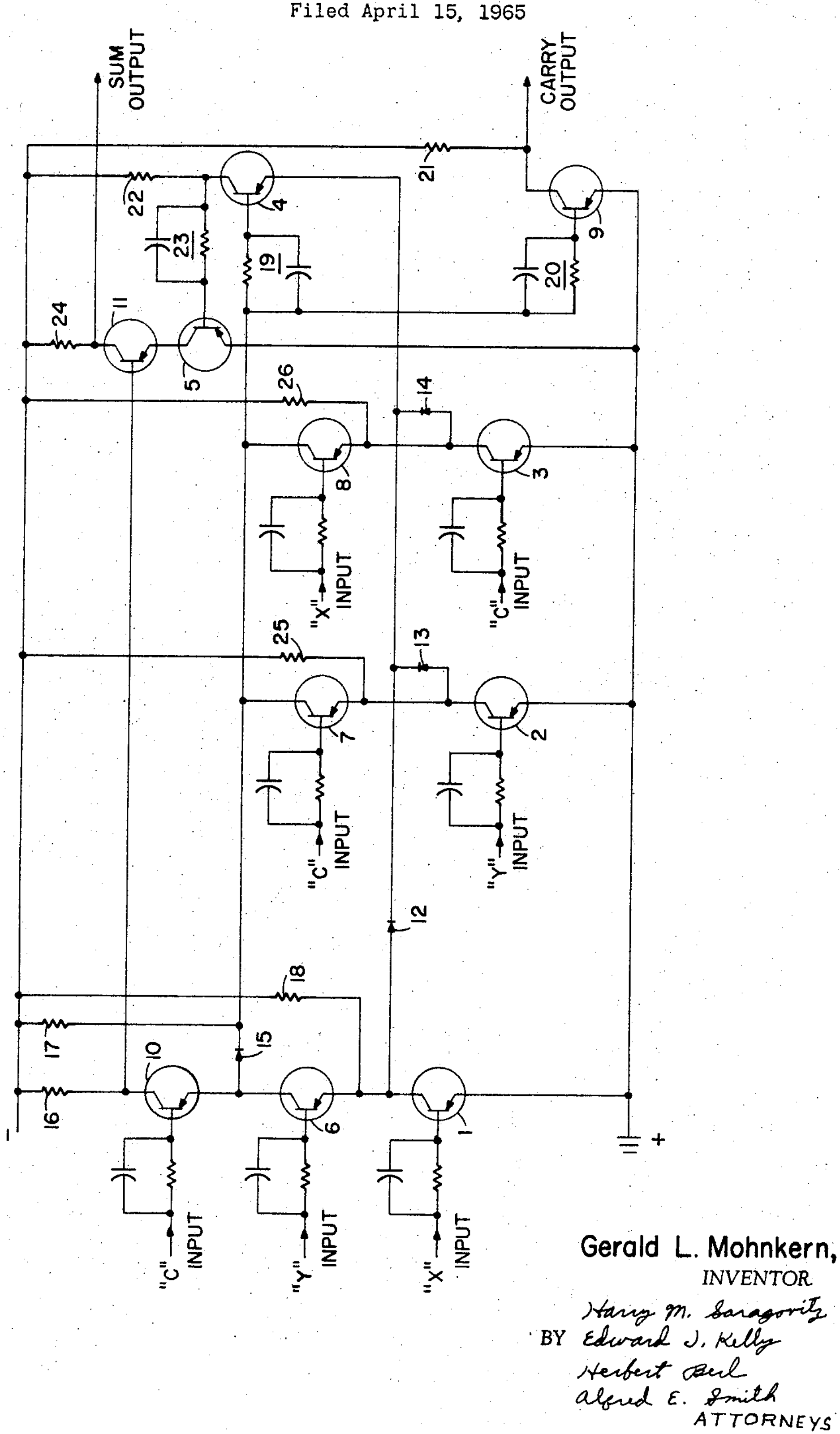
Gerald L. Mohnkern,
INVENTOR
BY Harry M. Saragovitz
Edward J. Kelly
Herbert Berl
Alfred E. Smith
ATTORNEYS United States Patent Office 3,353,009
Patented Nov. 14, 1967

3,353,009
SOLID STATE BINARY ADDER

Gerald L. Mohnkern, Las Cruces, N. Mex., assignor to the United States of America as represented by the Secretary of the Army Filed Apr. 15, 1965, Ser. No. 448,550
2 Claims. (Cl. 235—168)

ABSTRACT OF THE DISCLOSURE

A full adder which operates at high speeds and has moderate input impedance and low output impedance. Three distinct inputs and two outputs are provided and it requires no complementary inputs.

The invention described herein may be manufactured and used by or for the Government for governmental purposes without the payment of any royalty thereon.

This invention relates to a binary adder circuit and more particularly to a solid state binary adder circuit which operates at high speeds, requires no complementary inputs and uses fewer components than previous binary adders with these characteristics.

The requirements of a binary adder are that it produce a "one" at the sum output when the number of input "ones" is odd and that a "one" be generated at the carry output when there is more than one input with a value of "one."

Expressed in Boolean algebra, these requirements are:

(1) $S$=Sum Output$=X\overline{Y}\,\overline{C}+\overline{X}Y\overline{C}+\overline{X}\,\overline{Y}C+XYC$
(2) $Co$=Carry Output$=XY+XC+YC$ By use of the theorems of Boolean algebra, these expressions can be converted to the following:

$$(1)\quad S=\overline{\overline{(X+Y+C)(\overline{XY+XC+YC})(XYC)}}$$

$$(2)\quad Co=(\overline{\overline{XY+XC+YC}})$$

Although these expressions are more complex, the operations expressed are easily performed with transistors and diodes, as will be described in detail hereinbelow, providing a relatively simple and fast binary adder.

In view of these facts, an object of this invention is to provide a binary adder which operates at high speeds.

A further object of this invention is to provide a binary adder which requires no complementary inputs.

Another object of this invention is to provide a binary adder with moderate input impedance and low output impedance.

A still further object of this invention is to provide a binary adder that incorporates fewer active components than previous binary adders performing the same function.

Various other objects and advantages will appear from the following description of one embodiment of the invention, and the most novel features will be particularly pointed out hereinafter in connection with the appended claims and the accompanying drawing wherein the single figure is a schematic illustration of a preferred embodiment of the invention.

In the preferred embodiment of the present invention, transistors 1 through 11 are switched by inputs X, Y and C being "one" (−10 volts) or "zero" (0 volts) to give a "sum" or "carry" output according to the particular input condition.

Referring now to the drawing, transistors 1, 6 and 10 are connected in series collector to emitter with the collector of transistor 10 connected to a negative supply through biasing resistor 16 and the emitter of transistor 1 is connected to ground potential. The base of each transistor 1, 6 and 10 is connected to receive the X, Y and C inputs respectively. Similarly, transistors 2 and 7 and 3 and 8 are connected in series, with the collector of transistors 7 and 8 connected together and to the negative supply through biasing resistor 17 and the emitter of transistors 2 and 3 are connected to ground potential. The base of transistors 2, 3, 7 and 8 are connected to receive the Y, C, C and X inputs respectively. The collector of transistors 1, 2 and 3 are connected to the negative supply through biasing resistors 18, 25 and 26 respectively. The collector of transistor 6 is connected through diode 15 to the collector of transistors 7 and 8 and further connected to the base of transistors 4 and 9 through resistor-capacitor circuits 19 and 20 respectively. Transistor 4 has its emitter connected to the collector of transistors 1, 2 and 3 through diodes 12, 13 and 14 respectively. Transistor 9 has its emitter connected to ground potential, and the collector connects to the negative supply through biasing resistor 21 and further furnishes the "carry" output. The collector of transistor 4 is connected to the negative supply through resistor 22 and to the base of transistor 5 through resistor-capacitor circuit 23. The emitter of transistor 5 is connected to ground potential, and the collector is connected to the emitter of transistor 11. The base of transistor 11 is connected to the collector of transistor 10. The collector of transistor 11 is connected to the negative supply through resistor 24 and further supplies the "sum" output.

In operation, a level of −10 volts represents a "one," and a level of 0 volts represents a "zero." In this circuit when a "one" is applied at the base of a transistor, the transistor conducts and functions as a closed switch. A "zero" input to the base causes the transistor to turn off or act as an open switch. Therefore, in general, a "zero" input to any transistor results in a "one" output, and a "one" input results in a "zero" output. However, in the case of transistors whose emitter to ground circuits are in series with a second transistor, then the second transistor must be conducting (i.e., have a "one" input to its base) in order for the first transistor to actively conduct if a "one" is applied to its base.

As an example of the operation of the binary "adder," assume that X is "one" and Y and C are "zero." Transistors 1 and 8 will then have a base input, but only transistor 1 can conduct since transistor 3, which is in series with transistor 8, remains turned off. Since transistors 6, 7 and 8 are turned off, the input to transistor 4 will be a "one," and it will conduct through diode 12 and transistor 1. This results in a "zero" input to transistor 5, so that the sum output will be a "one."

If, in addition to X, Y is also a "one" but C is a "zero," then transistors 1 and 6 will be turned on. The resulting inputs to transistors 4 and 9 will be "zero" so that the carry output and the input to transistor 5 will both be "ones." Since C is "zero," the input to transistor 10 is "zero," and the input to transistor 11 is a "one." The inputs to transistors 5 and 11 are both "ones"; therefore they will both conduct, and the "sum" output will be a "zero."

If C is also a "one," transistor 10 will conduct through transistor 6 and 1 so that the input to transistor 11 will be a "zero." The resulting "sum" output will be a "one." The "carry" output will remain a "one," since the input to transistor 9 is still a "zero." Thus, the adder provides the proper outputs for 1, 2 or 3 inputs.

It is to be understood that the form of the invention that is herein shown and described is to be taken as a preferred example of the same, and that various changes and modifications may be resorted to without departing from the spirit of the invention or the scope of the subjoined claims.

I claim:

1. A binary adder comprising:

(a) a voltage source;

(b) a first input section including a first plurality of series connected transistors connected across said voltage source;

(c) a second input section including a second plurality of series connected transistors connected across said voltage source;

(d) a third input section including a third plurality of series connected transistors connected across said voltage source;

(e) a plurality of binary input means connected respectively to each of said transistors;

(f) biasing means coupled to each of said transistors whereby a binary "one" applied to one of said transistors will initiate conduction thereof;

(g) a first output transistor connected in series with at least one of said transistors of each of said input sections;

(h) said first output transistor having its base connected in series with at least two series connected transistors in each of said input sections;

(i) a second output transistor connected in parallel with said first output transistor the state of which controls the carry output;

(j) a third output transistor the state of which controls the sum output;

(k) a fourth output transistor connected in series with said third output transistor;

(l) said fourth output transistor being controlled by said first output transistor, whereby when said first output transistor is in one state, said fourth output transistor is in the opposite state;

(m) said series connected third and fourth transistors connected across said voltage source; and (n) said third output transistor having its base connected in series with said first input section.

2. A solid state binary adder comprising:

(a) first, second, and third input transistors connected in series, between a voltage source and ground potential;

(b) fourth and fifth series connected input transistors connected between said first and second series connected transistors and ground potential;

(c) sixth and seventh series connected input transistors connected in parallel with said fourth and fifth transistors;

(d) means connecting said voltage source to the common connection of said parallel connected transistors;

(e) means connecting said voltage source to the common connection of said second and third input transistors;

(f) means connecting said voltage source to the common connection of said fourth and fifth input transistors and to the common connection of said sixth and seventh input transistors;

(g) said first, fourth, and seventh transistors having a common input for receiving a first binary signal;

(h) said second and fifth transistors having a common input, for receiving a second binary signal;

(i) said third and sixth transistors having a common input for receiving a third binary signal;

(j) a first output transistor having its base connected to said common connection of said parallel connected transistors and its emitter connected to ground potential for providing a carry output signal;

(k) means connecting said voltage source to the collector of said first output transistor;

(l) a second output transistor having its base connected in common with the base of said first output transistor and its emitter connected to the common connection of said second and third, said fourth and fifth, and said sixth and seventh transistors;

(m) means connecting said voltage source to the collector of said second output transistor;

(n) third and fourth series connected output transistors for providing a sum output signal;

(o) said third output transistor having its base connected to said voltage source;

(p) said fourth output transistor having its base connected to the collector of said first input transistor;

(q) means connecting the collector of said fourth output transistor to said voltage source;

(r) a sum output terminal connected to the collector of said fourth output transistor;

(s) a carry output terminal connected to the collector of said first output transistor;

(t) a plurality of diodes connected respectively between the collector of said third, fifth and seventh input transistors and the emitter of said first output transistor; and (u) a diode connected between the collector of said second input transistor and the collector of said fourth input transistor.

References Cited

UNITED STATES PATENTS

| | | | |
|---|---|---|---|
| 3,178,590 | 4/1965 | Heilweil et al. | 307—88.5 |
| 3,218,483 | 11/1965 | Clapper | 307—88.5 |
| 3,234,371 | 2/1966 | Osofsky | 235—175 |
| 3,271,590 | 9/1966 | Sturman | 307—88.5 |

OTHER REFERENCES

Wilkes, M. V.: Automatic Digital Computers, John Wiley & Sons, Inc., New York, pp. 21–22.

MALCOLM A. MORRISON, *Primary Examiner.*

V. SIBER, *Assistant Examiner.*